United States Patent
Moore et al.

(10) Patent No.: US 7,602,703 B2
(45) Date of Patent: Oct. 13, 2009

(54) METHOD AND SYSTEM FOR PROVIDING ETHERNET PROTECTION

(75) Inventors: Francois Georges Joseph Moore, McKinney, TX (US); Michael Davis White, Richardson, TX (US); Jimmy O. Goodwin, Lucas, TX (US)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 11/564,581

(22) Filed: Nov. 29, 2006

(65) Prior Publication Data
US 2008/0126548 A1 May 29, 2008

(51) Int. Cl.
*H04L 12/26* (2006.01)
(52) U.S. Cl. .................................................. 370/217
(58) Field of Classification Search .................. 370/216, 370/219, 228, 217; 714/9
See application file for complete search history.

(56) References Cited

U.S. PATENT DOCUMENTS

| | | | |
|---|---|---|---|
| 6,717,909 B2 | 4/2004 | Leroux et al. | |
| 6,856,600 B1 | 2/2005 | Russell et al. | |
| 6,941,388 B1 | 9/2005 | Doraiswami | |
| 6,973,041 B1 | 12/2005 | Duschatko et al. | |
| 6,978,309 B1 | 12/2005 | Dorbolo | |
| 7,003,690 B2 | 2/2006 | Liva et al. | |
| 7,039,732 B1 | 5/2006 | House | |
| 7,065,038 B1* | 6/2006 | Brandt et al. | 370/219 |
| 2002/0181392 A1 | 12/2002 | Okuno | |
| 2003/0061533 A1* | 3/2003 | Perloff et al. | 714/9 |
| 2003/0081540 A1 | 5/2003 | Jones et al. | |
| 2003/0117952 A1* | 6/2003 | Ueno et al. | 370/228 |
| 2004/0098501 A1 | 5/2004 | Finn | |
| 2004/0107382 A1 | 6/2004 | Doverspike et al. | |
| 2004/0114510 A1 | 6/2004 | Miller et al. | |
| 2004/0228278 A1 | 11/2004 | Bruckman et al. | |
| 2005/0007951 A1 | 1/2005 | Lapuh et al. | |
| 2005/0094553 A1 | 5/2005 | Zhou et al. | |
| 2005/0122897 A1 | 6/2005 | Gonda | |
| 2005/0169322 A1 | 8/2005 | Chen et al. | |
| 2005/0180749 A1 | 8/2005 | Koley et al. | |
| 2005/0213547 A1 | 9/2005 | Meier | |
| 2005/0232143 A1* | 10/2005 | Halliday et al. | 370/216 |
| 2005/0243716 A1 | 11/2005 | Bitar et al. | |
| 2006/0020854 A1 | 1/2006 | Cardona et al. | |

* cited by examiner

*Primary Examiner*—Derrick W Ferris
*Assistant Examiner*—Stephen W Brown
(74) *Attorney, Agent, or Firm*—Baker Botts L.L.P.

(57) ABSTRACT

A method is provided for protecting a connection between a multi-service platform (MSP) and a local area network (LAN) that includes providing first and second LAN cards in the MSP. The first and second LAN cards are each coupled to the LAN over separate links. The method also includes providing a switch fabric. The switch fabric switches traffic having a synchronous optical network format for communication over a synchronous optical network to which the MSP is coupled. The switch fabric is coupled to the first and second LAN cards. The method further includes establishing a connection between the first and second LAN cards through the switch fabric. The method further includes establishing protection for traffic communicated between the LAN and the first LAN card by aggregating the links between the first and second LAN cards and the LAN.

16 Claims, 6 Drawing Sheets

METHOD AND SYSTEM FOR PROVIDING ETHERNET PROTECTION

TECHNICAL FIELD OF THE INVENTION

The present invention relates generally to communication systems and, more particularly, to a method and system for providing Ethernet protection.

BACKGROUND OF THE INVENTION

Telecommunications systems, cable television systems and data communication networks use networks to rapidly communicate large amounts of information between remote points. One type of network used to communicate such information is an optical network. In an optical network, information is communicated in the form of optical signals through optical fibers. Although many different types of optical networks may be used depending on the particular application and network size, one common type of optical network is a Synchronous Optical Network (SONET).

In SONET networks, as well as other types of optical and non-optical networks, it is important to provide equipment redundancy to protect against failures in the communication of information over the network. SONET networks may implement numerous types of protection techniques to address failures in the network, such as a node failure or a fiber cut. For example, SONET may employ redundant communication links. Therefore, in the event of a communication link outage, an alternate link may be provisioned.

Heterogeneous networks are increasingly being deployed by carriers of service provider networks for multi-service delivery. Heterogeneous networks are being driven today by the availability of multi-service platforms that can support many types of data traffic. For example, a multi-service platform may support Ethernet traffic for local area networks (LANs) and SONET traffic in metropolitan area networks (MANs). However, unlike SONET, Ethernet services are typically unprotected and operate under a "best effort" delivery system. Best effort services are not guaranteed and therefore do not provide high levels of reliability. It is generally desirable to provide high levels of reliability in heterogeneous networks.

SUMMARY OF THE INVENTION

The present invention provides a method and system for providing Ethernet protection that substantially eliminates or reduces at least some of the disadvantages and problems associated with previous methods and systems.

In accordance with a particular embodiment of the present invention, a method for protecting a connection between a multi-service platform (MSP) and a local area network (LAN) includes providing first and second LAN cards in the MSP. The first and second LAN cards are each coupled to the LAN over separate links. The method also includes providing a switch fabric. The switch fabric switches traffic having a synchronous optical network format for communication over a synchronous optical network to which the MSP is coupled. The switch fabric is coupled to the first and second LAN cards. The method further includes establishing a connection between the first and second LAN cards through the switch fabric. The method further includes establishing protection for traffic communicated between the LAN and the first LAN card by aggregating the links between the first and second LAN cards and the LAN.

Technical advantages of particular embodiments of the present invention include a method and system for providing Ethernet protection that supports reliable data transport beyond the standard Ethernet "best effort" services. Accordingly, risks associated with potential network failures are significantly reduced.

Further technical advantages of particular embodiments of the present invention include a method and system for providing Ethernet protection that enhances currently available network element architectures. Thus, particular embodiments of the present invention may provide Ethernet protection using existing hardware.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
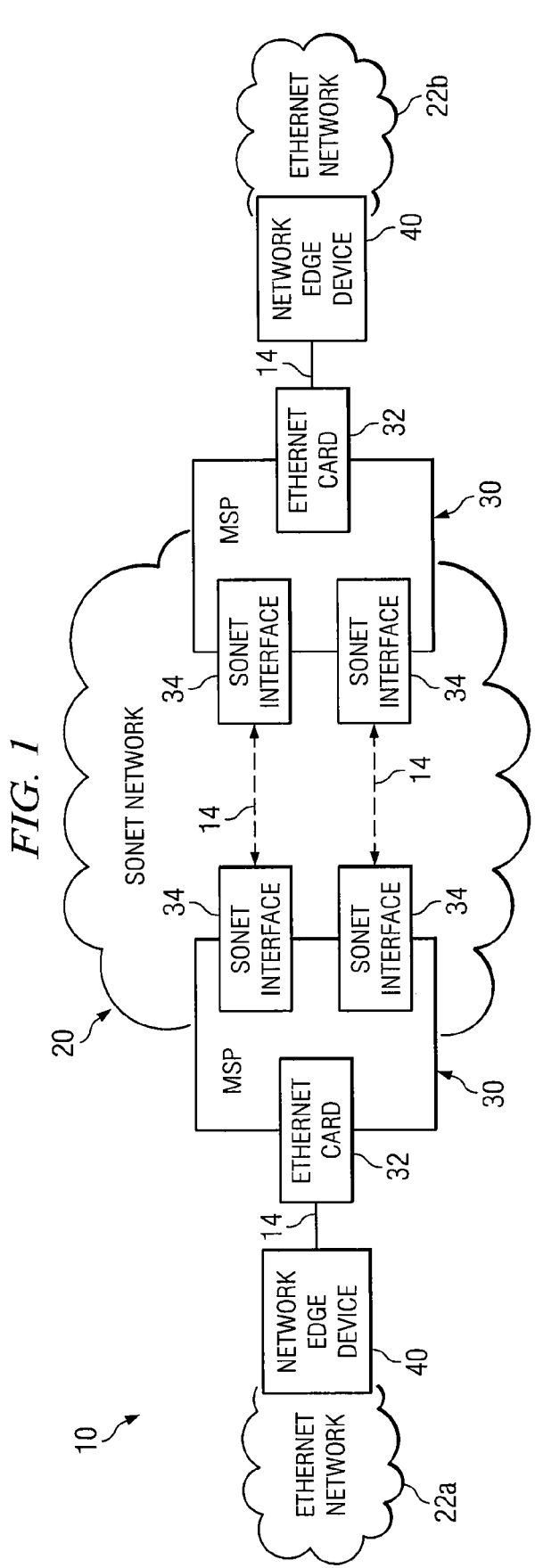
FIG. 1 is a block diagram illustrating an example heterogeneous network for communicating information over communication links.

FIG. 1 is a block diagram illustrating an example heterogeneous network 10 for communicating information over communication links 14. Network 10 generally represents any collection of hardware and/or software that communicates information between, and among, SONET network 20 and Ethernet networks 22. For example, a communication session may be established between one or more devices included in Ethernet network 22a and one or more devices in Ethernet network 22b via SONET network 20. According to one embodiment, Ethernet traffic may be communicated between Ethernet networks 22 and an associated multi-service platform (MSP) 30. As will be described in more detail below, MSP 30 may convert Ethernet traffic received from a network edge device 40 to SONET traffic by creating a synchronous steam of data from the Ethernet traffic. The synchronous stream may be communicated to SONET network 20. Similarly, MSP 30 may convert received SONET traffic to Ethernet traffic for communication from SONET network 20 to Ethernet networks 22 via network edge device 40. In this way, traffic may be communicated between Ethernet networks 22 via SONET network 20.

As discussed above, network 10 operates to provide services such as communication sessions between devices in Ethernet networks 22. A communication session may refer to an active communication between endpoints, measured from endpoint to endpoint. Information is communicated during a communication session. Information may refer to voice, data, text, audio, video, multimedia, control, signaling, other information, or any combination of the preceding. The information may be communicated using data traffic. Data traffic, also referred to as signals in this disclosure, generally refer to one or more bits of data, address, control or any combination thereof transmitted in accordance with any chosen scheme. Data traffic may be data, voice, address, and/or control in any representative format or protocol, such as Ethernet traffic for Ethernet protocols and SONET traffic for SONET protocols.

Network 10 may utilize any suitable communication protocols and technologies to provide communication sessions. Example communication protocols and technologies include those described by the Institute of Electrical and Electronics Engineers, Inc. (IEEE) 802.xx standards, the International Telecommunications Union (ITU-T) standards, the European Telecommunications Standards Institute (ETSI) standards, Internet Engineering Task Force (IETF) standards, the third generation partnerships project (3GPP) standards, or other standards.

Although SONET and Ethernet networks are described, SONET network 20 and Ethernet networks 22 may represent any suitable communication network. A communication network may represent all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding. Link 14 within network 10 may refer to any suitable physical or virtual information carrying media that establishes a communication pathway such as, for example, optical fiber, electrical wire, cable, bus traces, wireless channels, or any other suitable physical or virtual media.

Components of network 10 may include logic, an interface, memory, other component, or any suitable combination of the preceding. "Logic" may refer to hardware, software, other logic, or any suitable combination of the preceding. Certain logic may manage the operation of a device, and may include, for example, a processor. "Interface" may refer to logic of a device operable to receive input for the device, send output from the device, perform suitable processing of the input or output or both, or any combination of the preceding, and may include one or more ports, conversion software, or both. "Memory" may refer to logic operable to store and facilitate retrieval of information, and may include a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

As mentioned above, network 10 includes one or more network edge devices 40 and MSPs 30. Network edge device 40 may represent any device operable to communicate information between Ethernet network 22 and MSP 30. Network edge device 40 may be, for example, a router, hub, switch, gateway, access point, endpoint, edge point, or any other hardware, software, or embedded logic implementing any suitable communication protocol to allow for the communication of information between Ethernet networks 22 and MSP 30.

MSP 30 may represent any suitable device that is operable to provide an interface between Ethernet networks 22 and SONET network 20 in any suitable fashion. For example, MSPs 30 are each operable to communicate with an associated network edge device 40 using Ethernet cards 32 and communicate SONET traffic over SONET network 20 using SONET interfaces 34. MSP 30 may also convert Ethernet traffic to SONET traffic, and SONET traffic to Ethernet traffic. For example, MSP 30 may be a Multiservice Provisioning Platform (MSPP) operable to convert traffic using Ethernet over SONET (EOS) framers. EOS framers may refer to components that conform to a group of standards for communication of Ethernet traffic in SONET traffic. EOS framers may convert traffic using one or more various techniques, such as virtual concatenation (VC), link capacity adjustment scheme (LCAS), generic framing procedure (GFP), link access procedure for SDH (LAPS), or any other suitable techniques.

SONET network 20 may be any suitable network capable of transmitting voice and data information. SONET network 20, for example, may have any type of network configuration, such as a point-to-point network, a point-to-multipoint network, a hub network, or a ring network. Embodiments of the present invention may apply equally to other types of synchronous optical networks, such as synchronous digital hierarchy (SDH) networks, or to other WANS, such as asynchronous transfer mode (ATM) networks and Frame Relay networks.

Network 10 may experience network failures which may cause an interruption in communication sessions provided over network 10. A network failure may refer to any connectivity outage, such as link outages (fiber cuts, transmitter failures) and equipment outages (misconfiguration, processor or line card failures, power glitches, power supply failures). Network failures are problematic because it is often necessary to quickly restore connectivity following an outage, often within certain constraints and performance levels so as not to affect the traffic transported. Thus, many traffic-engineered networks that carry critical, high-priority traffic may require protection against network failures.

SONET networks, such as SONET network 20, may protect against network failures using various protection techniques. For example, SONET network 20 may provide protection using a self-healing ring network. A ring network is a network topology where all MSPs 30 are attached to the same set of physical links. The links in a ring network may form a loop. All links in a ring network may be unidirectional and traffic may flow in one direction on one half of the links, and in the reverse direction on the other half. Self-healing rings are particular ring networks that re-route traffic to provide protection. In the example, SONET traffic is sent from a source to a destination in one direction on a particular link. If the link fails, then the other direction may be used to reach the destination such that the failed link is avoided. Other embodiments of SONET protection techniques may also be used, such as mesh architectures and Automatic Protection Switching.

Ethernet networks, such as Ethernet network 22, are typically unprotected and provide only a "best effort" delivery system. Best effort services are not guaranteed and therefore do not provide high levels of reliability. Restoration of network connectivity in the event of a network failure in such networks may take several minutes, causing a disruption of service in the interim. Long outages may become a significant concern when the aim is to provide highly reliable service and uptime. For example, in SONET networks, the required recovery times may be in the order of tens of milliseconds.

Ethernet networks may provide protection against network failures using Link Aggregation defined as part of an IEEE specification 802.3ad. In particular, Link Aggregation allows one or more physical links to be aggregated together to form a logical link. Link Aggregation works at a variety of speeds. Particularly, the Link Aggregation standard may apply to 10M, 100M, and 1000M bit/second speeds, as well as future speeds, and aggregated links may use a combination of these speeds on a single logical link.

Link Aggregation further defines how connections may be combined to load share, load balance, and provide better resiliency for high-bandwidth network connections. For example, Link Aggregation also provides inherent automatic redundancy. In the example, if a network failure should cause one of the multiple physical links used in a logical link to fail, network traffic may be dynamically redirected to flow across the remaining good links in the logical link. The redirection may be triggered when a network edge device, such as network edge device 40, determines that the other end of a physical link is no longer communicating information on that physical link. Network edge device 40 may then dynamically reassign its traffic to the remaining physical link or physical links in the logical link and continue to do so until it determines that the device at the other end of the failed physical link is once again able to receive data on that physical link.

However, many current implementations of MSPs, such as MSP 30, do not fully support Link Aggregation because they do not support cross-communication of traffic between Ethernet cards. One technique to cure this deficiency includes aggregating links on the same Ethernet card. While this technique may protect against link outages in a particular circumstance, this technique does not protect against equipment outages (i.e. failure of the Ethernet card) and this is a significant limitation to this approach that makes it unacceptable to most service providers.

Particular embodiments of the present invention solve this problem by using EOS framers and a SONET switch fabric to connect separate Ethernet cards to support Link Aggregation or to otherwise provide redundant links to redundant cards. Unlike architectures that aggregate links on a single Ethernet card, certain embodiments of the present invention aggregate links to two or more Ethernet cards to create a single logical link. Additional details of example embodiments of the present invention are described in greater detail below.

Figure 2:
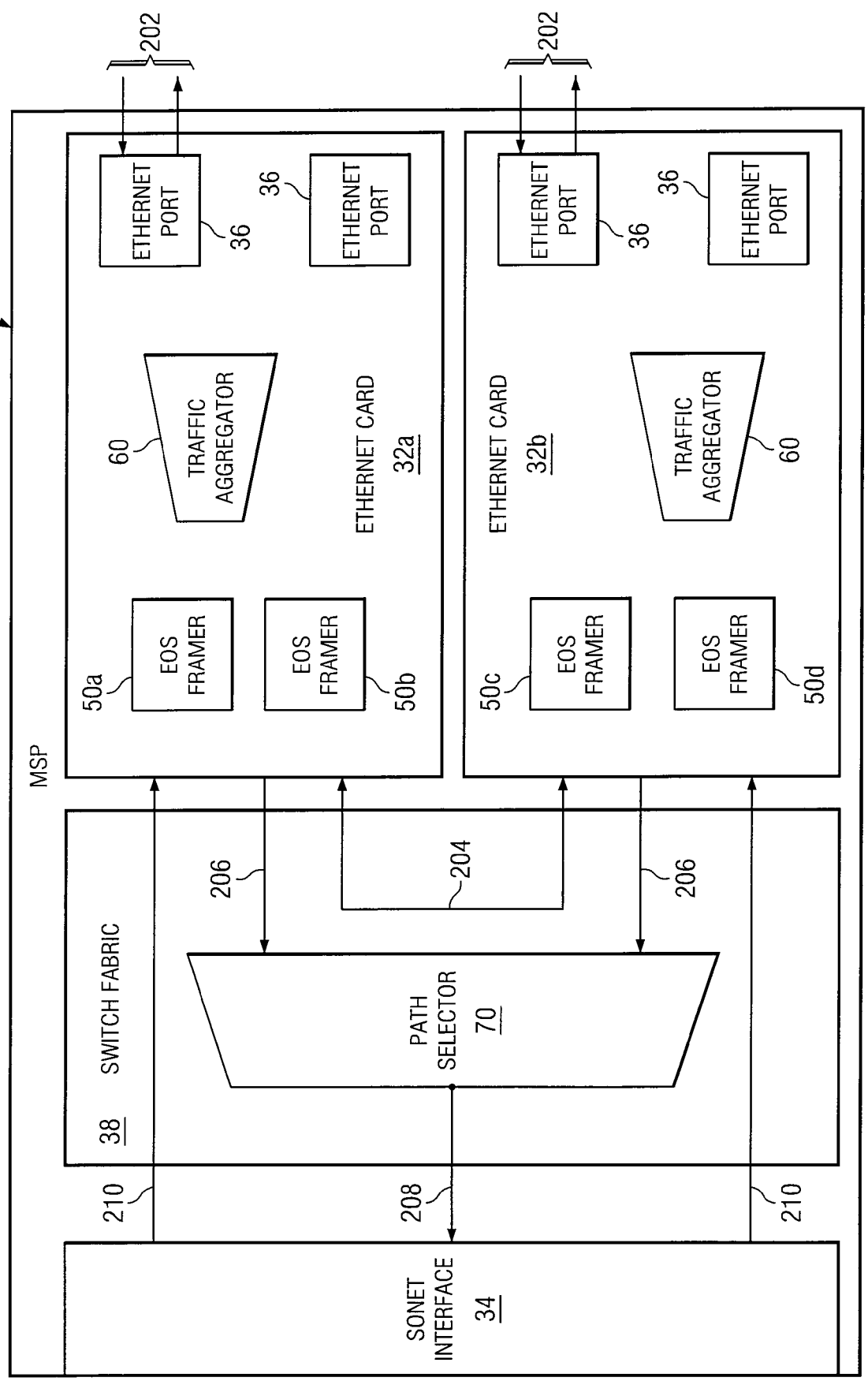
FIG. 2 is a block diagram illustrating details of a multi-service platform (MSP) in accordance with one embodiment of the present invention.

FIG. 2 is a block diagram illustrating details of MSP 30 in accordance with one embodiment of the present invention. Although selected components of MSP 30 are illustrated in FIG. 2 at a high level, it should be understood that MSP 30 may include any other well-known components of an MSP as appropriate for the operation of MSP 30.

According to the illustrated embodiment, MSP 30 includes a SONET interface 34 that communicates SONET traffic to and from SONET network, such as SONET network 20 from FIG. 1. SONET interface 34 may also include any combination of optical and/or electrical components for communicating SONET traffic.

MSP 30 also includes Ethernet cards 32a and 32b that each communicate traffic 202 to and from a network edge device of an Ethernet network through one or more ports 36, as indicated by reference number 202. Although two Ethernet cards 32a and 32b are illustrated, it should be understood that any suitable number of Ethernet cards may be included in MSP 30 depending upon the implementation.

MSP 30 also includes a switch fabric 38 that connects Ethernet cards 32a and 32b to SONET interface 34. For example, switch fabric 38 may be operable to communicate Synchronous Transport Signal (STS) frames to and from each Ethernet card 32 and SONET interface 34. As another example, switch fabric 38 may be operable to communicate STS frames between Ethernet cards 32.

Depending on the implementation, switch fabric 38 may perform many different well-known functions to facilitate the operation of MSP 30. For example, switch fabric 38 typically connects any number of interfaces together through switch fabric 38 to establish any type of point-to-point or point-to-multipoint connection. Although switch fabric 38 may have many other functions, one function relevant to the illustrated embodiment is the ability to create a crosslink between Ethernet cards 32a and 32b. A crosslink may refer to a communications link between two or more Ethernet cards. For example, switch fabric 38 may create a crosslink between Ethernet cards 32a and 32b such that Ethernet card 32a can receive a signal from Ethernet card 32b, and Ethernet card 32b can receive a signal from Ethernet card 32a, as indicated by reference number 204.

Switch fabric 38 may also communicate signals from Ethernet cards 32 to a path selector 70, as indicated by reference number 206. Path selector 70 may communicate a selected signal to SONET interface 34 for communication on the network, as indicated by reference number 208. Such a path selector 70 may be built into the switch fabric. Path selector 70 may be configured to select an active signal from the associated Ethernet cards 32a and 32b. For example, if path selector 70 receives an active signal from Ethernet card 32a and receives an inactive signal from Ethernet card 32b, then path selector 70 may select the active signal from Ethernet card 32a to be output to SONET interface 34. An active signal or active traffic may refer to a SONET frame containing valid Ethernet frames from Ethernet cards 32. According to a preferred embodiment, an inactive signal or inactive traffic may refer to a SONET frame containing a defect indicator in the signal. A defect indicator may refer to any indicator that denotes the quality of a signal, such as a Payload Defect Indicator (PDI). An inactive signal may also refer to a SONET frame containing idle Ethernet frames from Ethernet cards 32. Thus, active and inactive signals for path selector 70 may refer to the status of the incoming SONET frame. However, the present disclosure contemplates many types of techniques for selecting active and inactive signals. Various embodiments may include, some, all, or none of the enumerated techniques.

Switch fabric 38 may also communicate signals from SONET interface 34 to Ethernet cards 32, as indicated by reference number 210. For example, SONET interface 34 may receive SONET traffic from a SONET network and send the SONET traffic to switch fabric 38. Switch fabric 38 may receive the SONET traffic and forward the traffic to Ethernet cards 32.

Ethernet cards 32a and 32b may prepare received traffic for communication over the network to which MSP 30 is coupled. For example, Ethernet cards 32 may include EOS framers 50a, 50b, 50c, and 50d (or other suitable components) that receive Ethernet traffic and generate SONET frames including the Ethernet traffic for communication over a SONET network. Conversely, EOS framers 50a, 50b, 50c, and 50d may also receive SONET traffic that includes Ethernet frames and extract these Ethernet frames for communication over an Ethernet network. EOS framers may perform these functions using various encapsulation techniques. For example, GFP is a mapping standard for encapsulating Ethernet traffic packet data into synchronous SONET traffic. EOS framers 50a, 50b, 50c, and 50d may be implemented as logic on an Ethernet card or other devices connected to switch fabric 38, or may alternatively be built into switch fabric 38.

Typically, Ethernet cards 32 may include a port 36 for each EOS framer. For example, Ethernet card 32a includes two EOS framers 50a and 50b and two corresponding ports 36. As shown in the illustrated embodiment, one port 36 may be configured to be active and communicate traffic 202 to and from a network edge device, while the second port may be configured as an inactive port.

According to the illustrated embodiment, Ethernet cards 32a and 32b use EOS framers 50a, 50b, 50c, and 50d in order to prepare traffic for communication to switch fabric 38, and between Ethernet cards 32a and 32b. As will be described in more detail below, a crosslink in switch fabric 38 facilitates the transfer of Ethernet traffic between each of the Ethernet cards 32. To facilitate selection of the active Ethernet traffic and to enable linking of multiple Ethernet cards 32, Ethernet cards 32a and 32b include a traffic aggregator 60. Such traffic aggregators 60 may be built into Ethernet cards 32a and 32b using any appropriate hardware and/or software. Traffic aggregators 60 may select active Ethernet traffic for each Ethernet card. Traffic aggregators 60 may further support load balancing and a subset of Link Aggregation referred to as Link Aggregation Control Protocol (LACP) between Ethernet cards 32 and network edge device 40.

Figure 3:
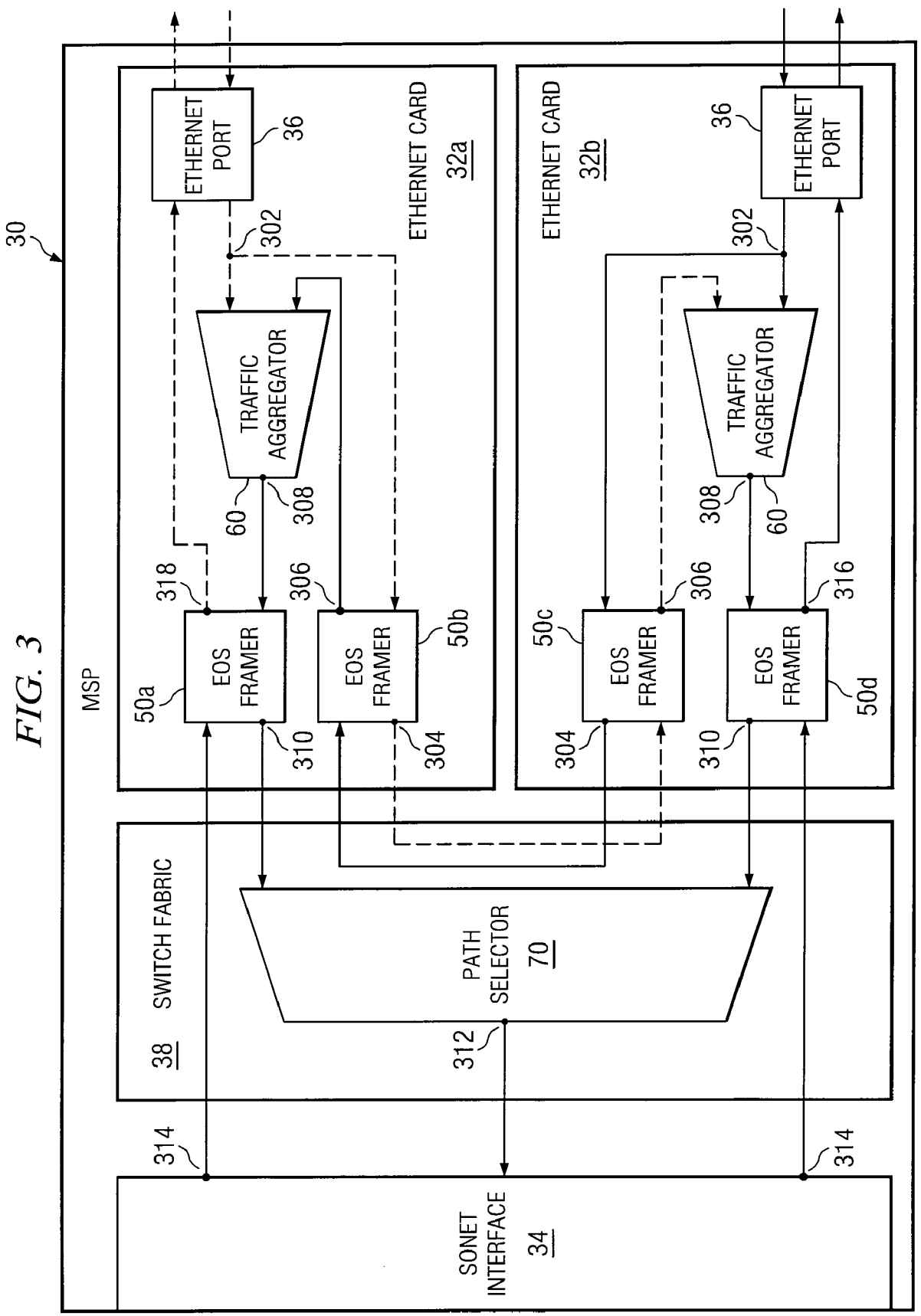
FIG. 3 is a block diagram illustrating operation of an MSP with a primary Ethernet card being active, in accordance with one embodiment of the present invention.

FIG. 3 is a block diagram illustrating operation of MSP 30 with a primary Ethernet card being active, in accordance with one embodiment of the present invention. For example, Ethernet card 32b may be designated as a primary card and Ethernet card 32a may be designated as a secondary card. In the example, the network edge device connected to Ethernet cards 32a and 32b may be configured to use Ethernet card 32b as an active card and use Ethernet card 32a as an inactive card or to load share the traffic between the two links. In the example, Ethernet card 32a, and its associated Ethernet link, may be used as a redundant card to facilitate substitution in the event of an outage at Ethernet card 32b or at the corresponding Ethernet port at network edge device 40. Therefore, if Ethernet card 32b fails or experiences a link outage with the network edge device, the Ethernet connection may be protected by communicating the traffic to Ethernet card 32a instead, as described below.

In one embodiment of operation of MSP 30, an active signal comprising Ethernet traffic is received at Ethernet card 32b and a complement signal is received at Ethernet card 32a. A complement signal may refer to various signals or no signal. For example, as an inactive card, Ethernet card 32a may not receive a signal from network edge device 40. As another example, Ethernet card 32a may receive a signal with idle Ethernet frames in Ethernet traffic. As another example, Ethernet card 32a may receive a redundant copy of the signal sent to active Ethernet card 32b. As yet another example, Ethernet card 32a may receive a load sharing signal that is intended to share the traffic load with active Ethernet card 32b. As indicated by reference number 302, Ethernet cards 32 make two complementary copies of their respective received signals.

As indicated by reference number 304, copies of each Ethernet card's signal are exchanged between Ethernet cards 32. For the active signal, the first copy of the active signal from Ethernet card 32b is passed to switch fabric 38, and switch fabric 38 forwards the active SONET traffic to EOS framer 50b of Ethernet card 32a. For the complement signal, the first copy of the complement signal from Ethernet card 32a is passed to switch fabric 38, and switch fabric 38 forwards the inactive SONET traffic to EOS framer 50c of Ethernet card 32b.

As indicated by reference number 306, EOS framers 50b and 50c receive and convert the SONET traffic back to Ethernet traffic, and pass the resulting Ethernet traffic to traffic aggregator 60. At Ethernet card 32a, aggregator 60 receives the complement signal received at port 36 of Ethernet card 32a and the active signal from EOS framer 50b. At Ethernet card 32b, aggregator 60 receives the complement signal from EOS framer 50c and the active signal from port 36 of Ethernet card 32b.

As indicated by reference number 308, traffic aggregators 60 of Ethernet cards 32a and 32b pass the active signal to EOS framers 50a and 50d, respectively, of Ethernet cards 32a and 32b. Thus, the EOS framer 50 of each Ethernet card 32a and 32b receives the active signal. The complement signal received by Ethernet cards 32 may be discarded, merged in the active stream in the event that load balancing is supported, or otherwise terminated and the resulting signal from Ethernet card 32b may be forwarded to path selector 70.

As indicated by reference number 310, the active signal is sent from EOS framer 50d to path selector 70. According to a preferred embodiment, based on the fact that Ethernet card 32a is deemed inactive, Ethernet card 32a may send a PDI indication in order to force path selector 70 to select the Ethernet over SONET traffic from the active Ethernet card 32b. When an active signal is selected at path selector 70, the signal is communicated over the SONET network, as indicated by reference number 312. For example, the selected signal may be communicated to SONET interface 34 of MSP 30, from which it is transmitted on the SONET network.

As indicated by reference number 314, a signal comprising SONET traffic may be received from the SONET network, and transmitted through switch fabric 38 to EOS framers 50a and 50d. For the active Ethernet card 32b, the signal may be converted from SONET traffic to Ethernet traffic by EOS framer 50d and forwarded to the network edge device, as indicated by reference number 316. For the inactive Ethernet card 32a, the signal is either forwarded or not forwarded to the network edge device, as indicated by reference number 318.

Figure 4:
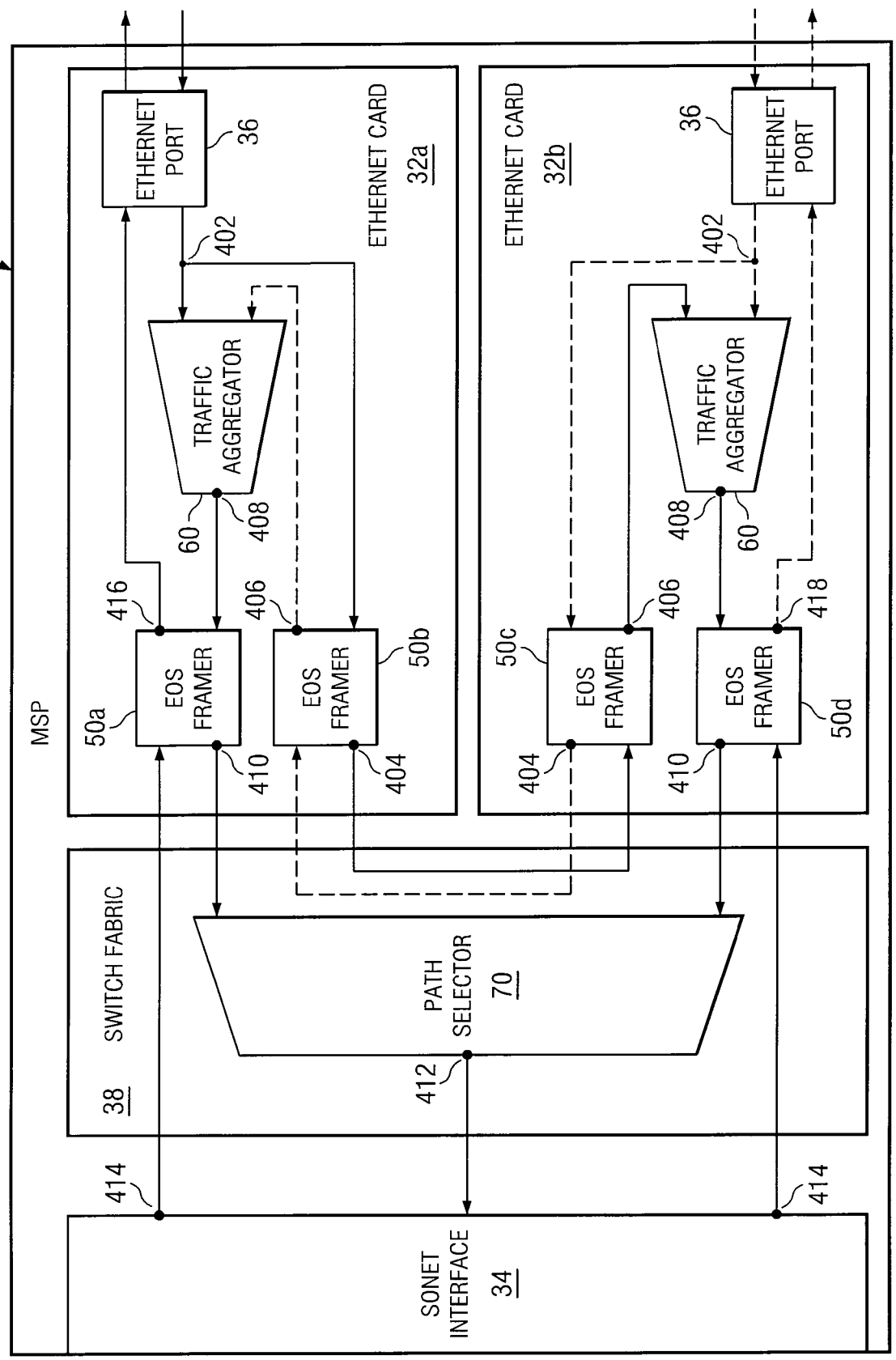
FIG. 4 is a block diagram illustrating operation of an MSP with a secondary Ethernet card being active, in accordance with one embodiment of the present invention.

FIG. 4 is a block diagram illustrating operation of MSP 30 with a secondary Ethernet card being active, in accordance with one embodiment of the present invention. Ethernet card 32a may initially be setup as an inactive card and Ethernet card 32b may initially be setup as an active card, as illustrated in FIG. 3. In this case, the network edge device may also be configured to automatically switch to the secondary Ethernet card 32a to protect the Ethernet connection. Such operation is discussed below with reference to FIG. 4.

In this figure, for any reason, the link between Ethernet card 32a and network edge device 40 may be deemed to be the primary or active link. Thus, an active signal comprising Ethernet traffic is received at Ethernet card 32a and a complement signal is received at Ethernet card 32b. Ethernet cards 32 make two copies of their respective received signals, as indicated by reference number 402.

As indicated by reference number 404, a copy of the complement signal and the active signal is exchanged between Ethernet cards 32. For the active signal, the first copy of the active signal from Ethernet card 32a is passed to switch fabric 38, and switch fabric 38 forwards the active SONET traffic to EOS framer 50c of Ethernet card 32b. For the complement signal, the first copy of the complement signal from Ethernet card 32b is passed to switch fabric 38, and switch fabric 38 forwards the complement SONET traffic to EOS framer 50b of Ethernet card 32a.

As indicated by reference number 406, EOS framers 50b and 50c receive and convert the SONET traffic back to Ethernet traffic, and pass the Ethernet traffic to traffic aggregator 60. At Ethernet card 32a, aggregator 60 receives the active signal received at port 36 of Ethernet card 32a and the complement signal from EOS framer 50b. At Ethernet card 32b, aggregator 60 receives the active signal from EOS framer 50c and the complement signal from port 36 of Ethernet card 32b.

As indicated by reference number 408, traffic aggregators 60 of Ethernet cards 32a and 32b pass the active signal to EOS framers 50a and 50d, respectively, of Ethernet cards 32a and 32b. Thus, the EOS framer 50 of each Ethernet card 32a and 32b receives the active signal. The complement signal received by Ethernet cards 32 may be discarded, merged in the active stream in the event that load balancing is supported, or otherwise terminated and the resulting signal from Ethernet card 32a may be forwarded to path selector 70.

As indicated by reference number 410, the active signal is sent from EOS framer 50a to path selector 70. According to a preferred embodiment, based on the fact that Ethernet card 32b is deemed inactive, Ethernet card 32b may send a PDI indication in order to force path selector 70 to select the Ethernet over SONET traffic from the active Ethernet card 32a. When an active signal is selected at path selector 70, the signal is communicated over the SONET network, as indicated by reference number 412. For example, the selected signal may be communicated to SONET interface 34 of MSP 30, from which it is transmitted on the SONET network.

As indicated by reference number 414, a signal comprising SONET traffic may be received from the SONET network, and transmitted through switch fabric 38 to EOS framers 50a and 50d. For the active Ethernet card 32a, the signal may be converted from SONET traffic to Ethernet traffic by EOS framer 50a and forwarded to the network edge device, as indicated by reference number 416. For the inactive Ethernet card 32b, the signal may be forwarded or not forwarded to the network edge device, as indicated by reference number 418.

Figure 5:
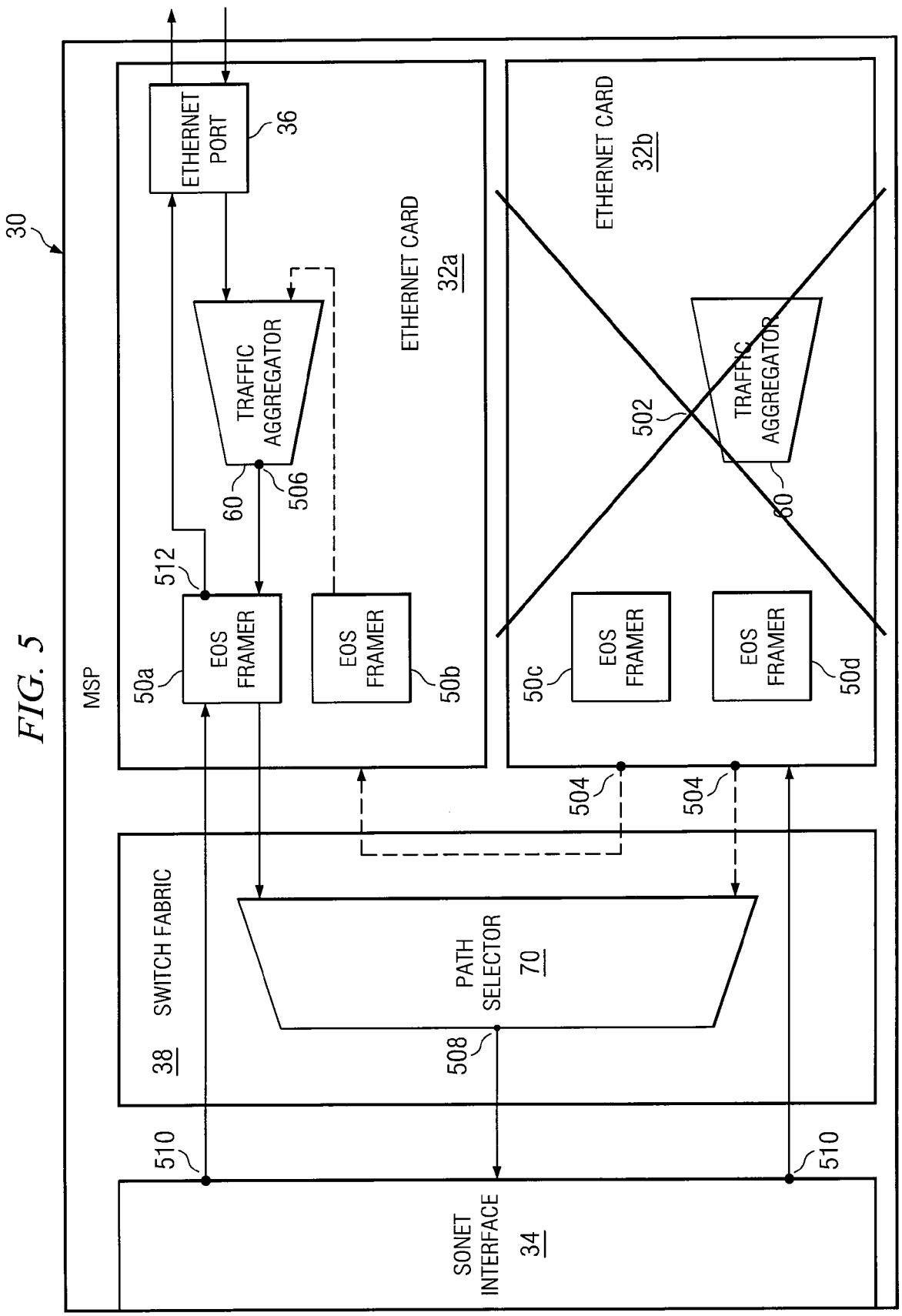
FIG. 5 is a block diagram illustrating operation of an MSP with a secondary Ethernet card being active, in accordance with another embodiment of the present invention.

FIG. 5 is a block diagram illustrating operation of MSP 30 with a secondary Ethernet card being active, in accordance with another embodiment of the present invention. Ethernet card 32a may initially be setup as an inactive card and Ethernet card 32b may initially be setup as an active card, as illustrated in FIG. 3. Ethernet card 32b may experience an equipment outage, as indicated by reference number 502. In the example, the network edge device may be configured to automatically switch to Ethernet card 32a to protect the Ethernet connection. Such operation is discussed below with reference to FIG. 5.

In this figure, an equipment failure has occurred at Ethernet card 32b. The network edge device connected to Ethernet card 32b may be configured to recognize the equipment failure because the network edge device no longer receives traffic from Ethernet card 32b. The network edge device may also be configured to automatically switch to the secondary Ethernet card 32a to send and receive Ethernet traffic. Thus, an active signal comprising Ethernet traffic is received at Ethernet card 32a and nothing is received at Ethernet card 32b. Depending on the nature of the equipment failure, Ethernet card 32b may not send a signal to Ethernet card 32a and path selector 70, as indicated by reference number 504. Aggregator 60 of Ethernet card 32a may send the active signal to path selector 70, as indicated by reference number 506. Path selector 70 selects the active signal input from Ethernet card 32a, as indicated by reference number 508.

As indicated by reference number 510, a signal comprising SONET traffic may be received from the SONET network, and transmitted through switch fabric 38 to Ethernet cards 32a and 32b. For the active Ethernet card 32a, the signal may be converted from SONET traffic to Ethernet traffic by EOS framer 50a and forwarded to the network edge device, as indicated by reference number 512. For the failed Ethernet card 32b, the signal is not forwarded.

As can be seen from the above description of FIGS. 3-5, unlike previous architectures that aggregate links on a single Ethernet card, example embodiments of the present invention provide EOS framers and a switch fabric to link two or more Ethernet cards, resulting in a logical link to support Link Aggregation. Therefore, in the event of a network failure, such as a link outage or an equipment outage, connectivity may be restored quickly and within certain constraints and performance levels so as not to affect the services transported. Thus, risks associated with network failures for networks that carry critical, high-priority traffic may significantly be reduced.

Further, in addition to providing the advantages discussed above, the use of EOS framers and a switch fabric to aggregate signals enhances currently available MSP architectures. Thus, particular embodiments of the present invention may provide Ethernet protection using existing hardware.

Figure 6:
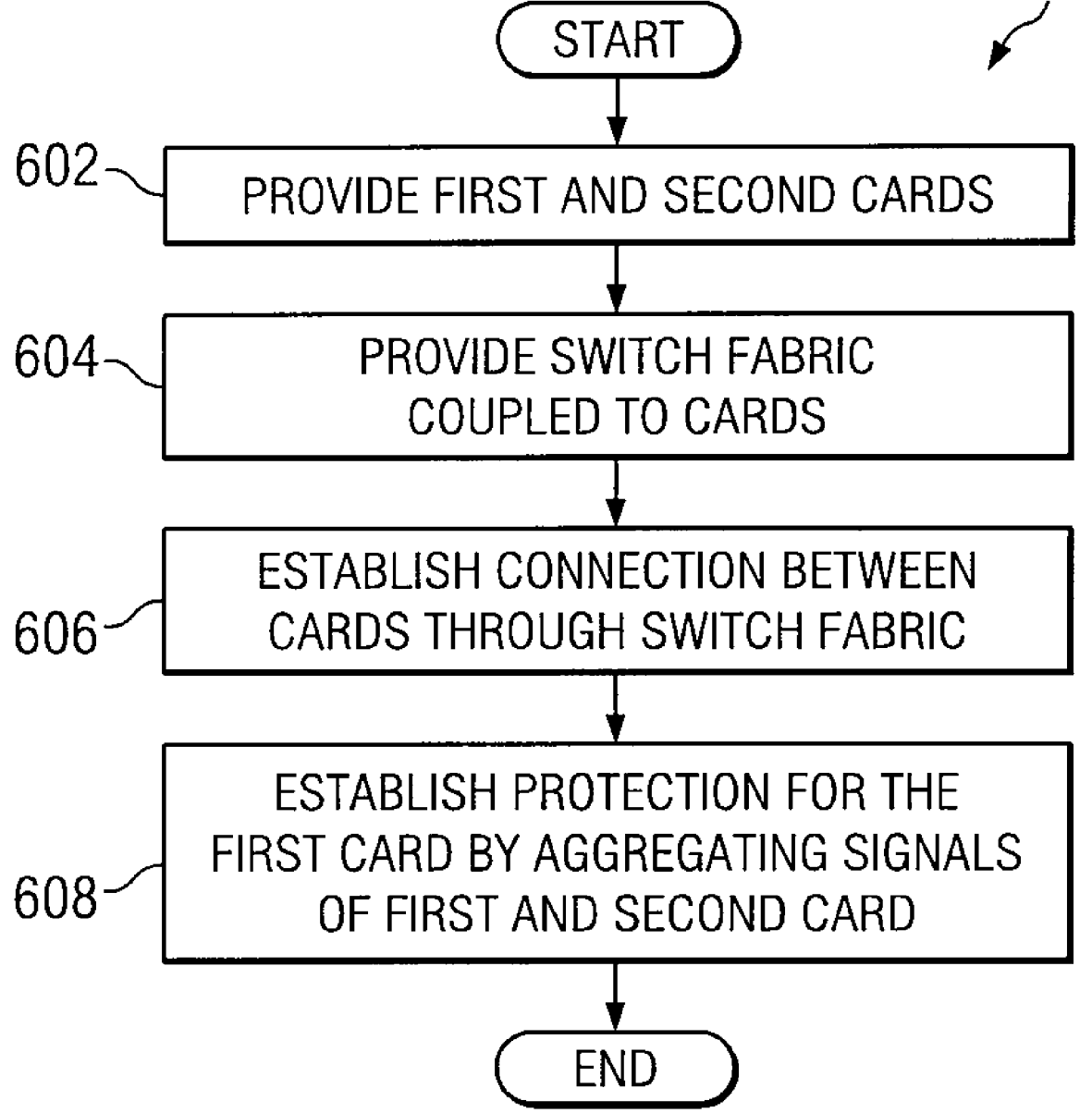
FIG. 6 illustrates an example method for providing Ethernet protection, in accordance with one embodiment of the present invention.

FIG. 6 illustrates an example method 600 for protecting a connection between an MSP and a local area network (LAN), in accordance with one embodiment of the present invention. The example method 600 begins at step 602 where a first and second Ethernet card is provided. The first and second Ethernet cards are each coupled to the LAN over a physical link. For example, the first Ethernet card may represent an active Ethernet card and the second Ethernet card may represent an inactive Ethernet card. In the example, a network edge device connected over the physical links to the Ethernet cards may be configured to send active traffic to the active Ethernet card and use the inactive Ethernet card as a backup Ethernet card.

At step 604, a switch fabric is provided. The switch fabric is coupled to the first Ethernet card and the second Ethernet card to create a crosslink between the first and second Ethernet cards. A crosslink may refer to an established connection between two or more Ethernet cards. The switch fabric may be operable to switch traffic having a SONET format for communication over a SONET to which the MSP is coupled.

At step 606, a crosslink may be created in the switch fabric between the active Ethernet card and the inactive Ethernet card such that the inactive Ethernet card receives an active signal from the active Ethernet card and the active Ethernet card receives a complement signal from the inactive Ethernet card. Thus a connection between the first LAN card and the second LAN card through the switch fabric is established, wherein traffic communicated over the connection is communicated in the SONET format.

At step 608, protection is established by aggregating the physical links to the LAN into a logical link. For example, at the active Ethernet card, the active signal is received at a port of the active Ethernet card and a complement signal is received from the inactive Ethernet card. At the inactive Ethernet card, the complement signal is received at a port of the inactive Ethernet card and active signal is received from the active Ethernet card. Thus, an active signal is communicated between two Ethernet cards to support Link Aggregation. The logical link may be operable to facilitate load balancing. Further, if either LAN card fails, or a link fails, the connection may revert to a protected connection as described in FIG. 3, FIG. 4, and FIG. 5.

It should be understood that some of the steps illustrated in FIG. 6 may be combined, modified or deleted where appropriate, and additional steps may also be added to the flowchart. Additionally, as indicated above, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within MSP 30, other and different components may be utilized to accommodate particular needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for protecting a connection between a multi-service platform and a local area network (LAN), comprising:
   providing first and second LAN cards in the multi-service platform, wherein the first and second LAN cards are each coupled to the LAN over separate links;
   providing a switch fabric in the multi-service platform, the switch fabric operable to switch traffic having a synchronous optical network format for communication over a synchronous optical network to which the multi-service platform is coupled, the switch fabric coupled to the first LAN card and the second LAN card;
   receiving traffic at the first and second LAN cards via the links;
   formatting the received traffic in the synchronous optical network format;
   communicating the synchronous optical network formatted traffic between the first and second LAN cards via the switch fabric;
   selecting, at the first LAN card, between the received traffic via the link coupling the first LAN card to the LAN and the traffic received via the second LAN card based on which traffic is active;
   selecting, at the second LAN card, between the received traffic via the link coupling the second LAN card to the LAN and the traffic received via the first LAN card based on which traffic is active; and
   establishing protection for traffic communicated between the LAN and the first LAN card by aggregating the links between the first and second LAN cards and the LAN.

2. The method of claim 1, further comprising providing a path selector in the switch fabric operable to select between a first input and a second input of the path selector, the first input of the path selector connected to the first LAN card, the second input of the path selector connected to the second LAN card.

3. The method of claim 1, further comprising sending, by the first and second LAN card, the selected traffic to the path selector.

4. The method of claim 1, further comprising:
   providing a first traffic aggregator in the first LAN card, the first traffic aggregator operable to select between traffic received from the second LAN card and traffic received from the link coupling the first LAN card to the LAN; and
   providing a second traffic aggregator in the second LAN card, the second traffic aggregator operable to select between traffic received from the first LAN card and traffic received from the link coupling the second LAN card to the LAN.

5. The method of claim 1, further comprising: designating the first LAN card as an active card and the second LAN card as an inactive card;
   detecting a network failure at the first LAN card; and
   designating the first LAN card as an inactive card and the second LAN card as an active card in response to the detected failure.

6. The method of claim 1, wherein the first and second LAN cards are operable to facilitate load balancing.

7. The method of claim 1, wherein the links are aggregated according to the Institute of Electrical and Electronics Engineers, Inc. (IEEE) 802.03ad Link Aggregation Protocol.

8. A multi-service platform coupled to a local area network (LAN), comprising:
   first and second LAN cards in the multi-service platform, wherein the first and second LAN cards are each coupled to the LAN over separate links; and
   a switch fabric, the switch fabric operable to switch traffic having a synchronous optical network format for communication over a synchronous optical network to which the multi-service platform is coupled, the switch fabric coupled to the first LAN card and the second LAN card; and
   wherein the multi-service platform is operable to:
      receive traffic at the first and second LAN cards via the links;
      format the received traffic in the synchronous optical network format;
      communicate the synchronous optical network formatted traffic between the first and second LAN cards via the switch fabric;
      select, at the first LAN card, between the received traffic via the link coupling the first LAN card to the LAN and the traffic received via the second LAN card based on which traffic is active;
      select, at the second LAN card, between the received traffic via the link coupling the second LAN card to the LAN and the traffic received via the first LAN card based on which traffic is active; and
      establish protection for traffic communicated between the LAN and the first LAN card by aggregating the links between the first and second LAN cards and the LAN.

9. The multi-service platform of claim 8, wherein the multi-service platform further comprises a path selector in the switch fabric operable to select between a first input and a second input of the path selector, the first input of the path selector connected to the first LAN card, the second input of the path selector connected to the second LAN card.

10. The multi-service platform of claim 8, wherein the multi-service platform is further operable to send, by the first and second LAN card, the selected traffic to the path selector.

11. The multi-service platform of claim 8, wherein the multi-service platform further comprises:
   a first traffic aggregator in the first LAN card, the first traffic aggregator operable to select between traffic received from the second LAN card and traffic received from the link coupling the first LAN card to the LAN; and
   a second traffic aggregator in the second LAN card, the second traffic aggregator operable to select between traffic received from the first LAN card and traffic received from the link coupling the second LAN card to the LAN.

12. The multi-service platform of claim 8, wherein the multi-service platform is further operable to:

designate the first LAN card as an active card and the second LAN card as an inactive card;

detect a network failure at the first LAN card; and designate the first LAN card as an inactive card and the second LAN card as an active card in response to the detected failure.

13. The multi-service platform of claim 8, wherein the first and second LAN cards are operable to facilitate load balancing.

14. The multi-service platform of claim 8, wherein the links are aggregated according to the Institute of Electrical and Electronics Engineers, Inc. (IEEE) 802.03ad Link Aggregation Protocol.

15. A system for protecting a connection between a multi-service platform and a local area network (LAN), comprising:

a multi-service platform, the multi-service platform comprising:

first and second LAN cards, wherein the first and second LAN cards are each coupled to the LAN over separate links;

a switch fabric, the switch fabric operable to switch traffic having a synchronous optical network format for communication over a synchronous optical network to which the multi-service platform is coupled, the switch fabric coupled to the first LAN card and the second LAN card; and means for:

receiving traffic at the first and second LAN cards via the links;

formatting the received traffic in the synchronous optical network format;

communicating the synchronous optical network formatted traffic between the first and second LAN cards via the switch fabric;

selecting, at the first LAN card, between the received traffic via the link coupling the first LAN card to the LAN and the traffic received via the second LAN card based on which traffic is active;

selecting, at the second LAN card, between the received traffic via the link coupling the second LAN card to the LAN and the traffic received via the first LAN card based on which traffic is active; and establishing protection for traffic communicated between the LAN and the first LAN card by aggregating the links between the first and second LAN cards and the LAN.

16. The system of claim 15, wherein the multi-service platform further comprises:

a path selector in the switch fabric operable to select between a first input and a second input of the path selector, the first input of the path selector connected to the first LAN card, the second input of the path selector connected to the second LAN card.

\* \* \* \* \*